(12) United States Patent
Parris et al.

(10) Patent No.: US 12,709,056 B2
(45) Date of Patent: Aug. 18, 2026

(54) METHOD AND APPARATUS FOR 3D PRINTING USING CONTROLLED UV LASER-ASSISTED POLYMERIZATION

(71) Applicants: George Edward Parris, Gaithersburg, MD (US); Alexander Roy Parris, Gaithersburg, MD (US)

(72) Inventors: George Edward Parris, Gaithersburg, MD (US); Alexander Roy Parris, Gaithersburg, MD (US)

( * ) Notice: Subject to any disclaimer, the term of this patent is extended or adjusted under 35 U.S.C. 154(b) by 0 days.

(21) Appl. No.: 18/415,705

(22) Filed: Jan. 18, 2024

(65) Prior Publication Data

US 2025/0073988 A1 Mar. 6, 2025

Related U.S. Application Data

(60) Provisional application No. 63/580,820, filed on Sep. 6, 2023.

(51) Int. Cl.

| | |
|---|---|
| ***B29C 64/268*** | (2017.01) |
| ***B29C 64/129*** | (2017.01) |
| ***B29C 64/393*** | (2017.01) |
| *B33Y 10/00* | (2015.01) |
| *B33Y 30/00* | (2015.01) |
| *B33Y 50/02* | (2015.01) |

(52) U.S. Cl.

CPC .......... *B29C 64/129* (2017.08); *B29C 64/268* (2017.08); *B29C 64/393* (2017.08); *B33Y 10/00* (2014.12); *B33Y 30/00* (2014.12); *B33Y 50/02* (2014.12)

(58) Field of Classification Search

CPC ... B29C 64/129; B29C 64/393; B29C 64/268; B29C 64/135; B29C 64/35; B33Y 10/00; B33Y 30/00; B33Y 50/02

USPC .......................................................... 264/401

See application file for complete search history.

(56) References Cited

U.S. PATENT DOCUMENTS

| | | | | |
|---|---|---|---|---|
| 4,929,402 A * | 5/1990 | Hull | B33Y 10/00 | 427/532 |
| 2004/0094728 A1 * | 5/2004 | Herzog | B22F 10/364 | 250/559.22 |

(Continued)

*Primary Examiner* — Armand Melendez

(74) *Attorney, Agent, or Firm* — Ingenium Patents LLC; Peter R Kramer

(57) ABSTRACT

A method and apparatus for forming a three-dimensional object using UV-sensitive liquid resin is disclosed herein. The apparatus employs UV lasers to manipulate intensity, position, and movement, thereby initiating resin polymerization within a transparent container. The apparatus controls premature polymerization by chilling the resin, thereby enhancing UV light penetration. The apparatus can include multiple synchronized laser beams, thereby strengthening internal polymerization. The apparatus incorporates UV-emitting devices within the resin and adjusts laser operations in real-time, using a specialized stage in the container for depth regulation. The approach ensures resin temperature consistency and replaces surrounding air with inert gas, thereby averting oxidation. After polymerization, the method separates the object from residual resin, guiding it from a flexible to a solid state. This separation leverages density differences, temperature management, and chemical assistance, thereby securing the object's structural precision after detachment.

1 Claim, 8 Drawing Sheets

(56) References Cited

U.S. PATENT DOCUMENTS

| | | | | |
|---|---|---|---|---|
| 2015/0165678 | A1* | 6/2015 | Ding | B33Y 10/00 425/150 |
| 2017/0173892 | A1* | 6/2017 | Steele | B29C 35/0805 |
| 2019/0292648 | A1* | 9/2019 | Parris | C01B 32/225 |
| 2020/0361152 | A1* | 11/2020 | Shusteff | B29C 64/153 |
| 2020/0384682 | A1* | 12/2020 | Loterie | B29C 64/241 |

* cited by examiner

METHOD AND APPARATUS FOR 3D PRINTING USING CONTROLLED UV LASER-ASSISTED POLYMERIZATION

TECHNICAL FIELD

The field of the present invention relates to additive manufacturing, specifically to the use of lasers and UV-sensitive liquid resins in the creation of three-dimensional objects.

BACKGROUND

Traditional manufacturing techniques, often categorized as subtractive or formative processes, are regularly employed in various industries. Subtractive methods, such as machining, involve the removal of material to shape an item, often resulting in significant material waste. Formative methods, including molding and casting, require predefined molds, which restrict design flexibility and increase production time and costs for unique or low-volume items.

The advent of additive manufacturing, commonly known as 3D printing, introduced a solution aiming to mitigate these limitations. This technology builds objects layer-by-layer from material in a powdered, liquid, or filament form, directed by digital 3D model data. However, despite its innovative approach, conventional 3D printing faces several challenges. The layer-by-layer approach often results in time-consuming processes, structural weaknesses due to layer adhesion variability, and difficulties in creating hollow, intricate, or overhanging features without additional support structures.

In the context of 3D printing using photopolymerization, a process where light causes chains of molecules in the resin to link, forming polymers, there are specific limitations. First, the process typically involves layer-by-layer construction, which restricts the building speed and might require support structures for complex geometries. Second, the depth of light penetration affects the curing process, limiting the aspect ratio (height to width) of products and often requiring post-processing. Additionally, there is a need for consistent and uniform light exposure, which is hard to maintain over varying geometries and sizes of printed objects.

Moreover, these systems commonly face constraints with material properties. The resins used in photopolymerization often have limitations regarding structural integrity, temperature resistance, and finished product resilience. Furthermore, incorporating additional materials or inclusions into the print, such as metals or other components, is particularly challenging without interrupting the printing process.

Another challenge involves the controlled curing of resin in liquid form, especially when attempting to build in freeform without the confines of layer-by-layer progression. Current methods struggle with maintaining the equilibrium between solidification for structure building and keeping the surrounding resin in liquid form. This balance is crucial for intricate designs and internal structures.

Furthermore, many existing technologies are not conducive to scaling up for larger products due to equipment size limitations and the need for extensive post-processing and assembly. Also, they often lack the capability for on-site modifications or repairs, requiring entire objects to be reprinted instead of allowing targeted corrections or improvements.

These challenges delineate a clear gap in the current state of manufacturing technology, emphasizing the need for advancements in methods that allow for precise, rapid, and versatile 3D object creation. The industry requires a solution that addresses these challenges by enabling the efficient production of complex geometries, incorporating various materials, and providing superior control over the polymerization process, thereby enhancing the quality, functionality, and applicability of manufactured products. There exists a need for an invention that overcomes these limitations, offering improved flexibility, efficiency, and customization in the production of three-dimensional objects.

SUMMARY OF THE INVENTION

The present invention discloses an apparatus for forming a three-dimensional object from a UV-sensitive liquid resin. The apparatus includes a transparent container for holding the UV-sensitive liquid resin, at least one UV laser configured to emit a beam of UV light operative to cure said UV-sensitive liquid resin, and a control unit configured to adjust the operation of the at least one UV laser, including the intensity and movement of the UV light.

In another embodiment, the at least one UV laser is configured to emit light within a wavelength range of 200 to 450 nm.

In a further embodiment, the apparatus includes a temperature control unit configured to facilitate the chilling or freezing of the UV-sensitive liquid resin to allow for deeper penetration of the UV light without initiating polymerization.

In yet another embodiment, the apparatus includes means for reinforcing the UV light within the UV-sensitive liquid resin by the coincident projection of at least one additional UV light beam.

In a different embodiment, the apparatus includes at least one optical cable or hollow probe attachable to the at least one UV laser and capable of being inserted into the UV-sensitive liquid resin to direct the UV light and facilitate the formation of the three-dimensional object.

In another embodiment, the apparatus includes a stage positioned within the transparent container, said stage configured to adjust the depth of the UV-sensitive liquid resin exposed to the laser light within the container.

In a further embodiment, the apparatus includes a temperature control unit configured to maintain the UV-sensitive liquid resin at a predefined temperature.

In yet another embodiment, the apparatus includes an inert gas system designed to replace the air above the UV-sensitive liquid resin within the transparent container to prevent oxidation during the polymerization process.

In a different embodiment, the UV-sensitive liquid resin includes a leuco dye configured to change color upon the polymerization of the resin.

In another embodiment, the UV-sensitive liquid resin is characterized by a density that changes upon polymerization. For example, depending on the degree of polymerization, the density of an acrylic resin may vary from about 1.05 to 10 g/mL, thereby facilitating the separation of residual resin by density.

In a further embodiment, the invention provides a method for forming a three-dimensional object. The method includes providing a UV-sensitive liquid resin within a transparent container, irradiating said UV-sensitive liquid resin with at least one beam of UV light from at least one UV laser to induce polymerization and form the three-dimensional object and controlling the operation of the at least one UV laser by adjusting the intensity, position, and movement of the laser beam within the UV-sensitive liquid resin.

In yet another embodiment, the irradiating step includes using at least one UV laser emitting light within a wavelength range of 200 to 450 nm.

In a different embodiment, the method includes chilling the UV-sensitive liquid resin to prevent premature polymerization before the UV light penetrates deeper into the resin.

In another embodiment, the method includes reinforcing the beam inside the resin by coincidence with at least one other beam projected through other parts of the chilled resin.

In a further embodiment, the method includes introducing UV-emitting devices into the UV-sensitive liquid resin to facilitate the formation of the three-dimensional object.

In yet another embodiment, the method includes adjusting the depth of the UV-sensitive liquid resin within the transparent container by using a stage positioned within the container.

In a different embodiment, the method includes maintaining the UV-sensitive liquid resin at a predefined temperature throughout the polymerization process.

In another embodiment, the method includes replacing the air in the environment above the UV-sensitive liquid resin with an inert gas to prevent oxidation during the polymerization process.

In a further embodiment, the method includes separating the formed three-dimensional object from the residual liquid resin, wherein the three-dimensional object undergoes a transition from a flexible state during polymerization to a hardened state.

In yet another embodiment, the transition from a flexible state to a hardened state includes further curing by general UV irradiation or heat application after separating the three-dimensional object from the residual liquid resin.

In a different embodiment, the separation of the three-dimensional object from the residual liquid resin is facilitated by a density difference, utilizing immiscible aqueous saline solutions with densities ranging from 1.00 to 1.20 g/mL.

In another embodiment, the method includes the use of an organic solvent that is miscible with the liquid resin and suppresses further polymerization, said solvent aiding in the separation of the desired polymerized products from the residual liquid resin by decreasing the resin's viscosity.

In a further embodiment, the organic solvent is acetone, which has minimal effect on the hardened state of the three-dimensional objects, thereby preserving the integrity of the formed objects while facilitating the removal of residual unpolymerized liquid resin.

BRIEF DESCRIPTION OF THE DRAWINGS

FIG. 5, incorporating an external tube facilitating inert gas circulation to protect the probe amidst the resin, in accordance with an embodiment of the present disclosure.

DETAILED DESCRIPTION OF EXAMPLE EMBODIMENTS

Example embodiments of the disclosure now will be described more fully hereinafter with reference to the accompanying drawings, in which example embodiments are shown. The concepts discussed herein may, however, be embodied in many different forms and should not be construed as limited to the example embodiments set forth herein; rather, these embodiments are provided so that this disclosure will be thorough and complete, and will fully convey the scope to those of ordinary skill in the art. Like numbers refer to like elements but not necessarily the same or identical elements throughout.

Reference will now be made in detail to the current embodiment of the invention, an example of which is illustrated in the accompanying drawings.

Figure 1:
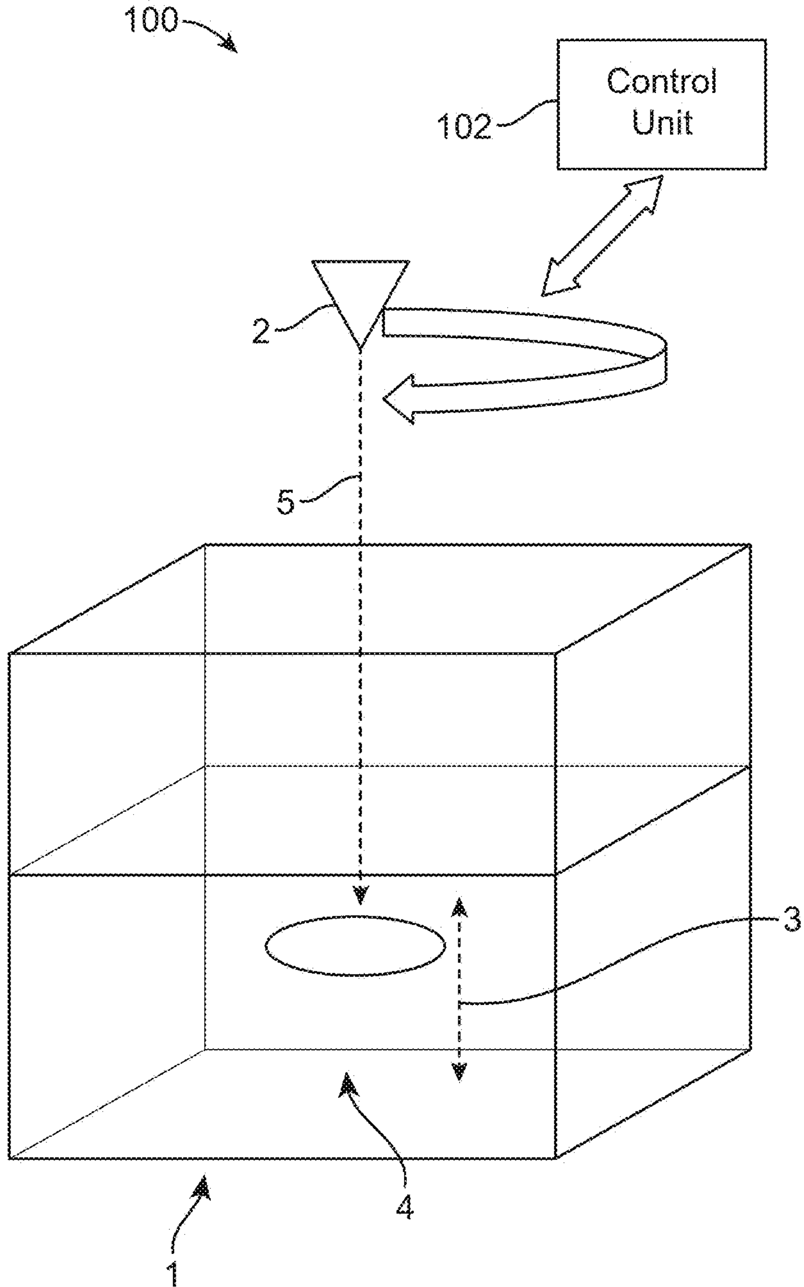
FIG. 1 illustrates a schematic view of an apparatus of forming three dimensional objects, in accordance with an embodiment of the present disclosure.

FIG. 1 illustrates a schematic view of an apparatus for forming 3D objects 100 (hereinafter referred to as apparatus 100), in accordance with an embodiment of the present subject matter. In an embodiment, the apparatus (100) is equipped with a container (1) designated to accommodate liquid resin (4). The construction of the container (1) permits the passage of UV light, a critical factor in the curing process of the resin. Within the container, a stage (3) is integrated, designed for the purpose of adjusting the depth of the resin exposed to the laser beam, a feature that enables a shift from a minimal layer thickness to a considerable depth depending on the operational necessity. In an embodiment, the movable stage (3) can be positioned to allow liquid resin to be exposed at various depths ranging from a thin film (typically less than 1 cm) to much deeper depts (up to about 5 cm).

Positioned in proximity to the container is a laser (2). The laser (2) is configured for the emission of a laser beam (5) selected for its wavelength that is directed into the resin (4). The interaction between the laser beam (5) and the resin is dynamic; the laser (2) might remain stationary or it may undergo movement, thereby altering the point of contact with the resin (4). A notable characteristic during the operation is the dissipation of the laser beam (5) upon its entry into the resin, leading to variations in the depth of curing within the resin body due to the gradual loss of energy as the beam propagates.

The apparatus (100) allows for operational flexibility wherein the resin (4) itself can be subjected to movement, such as rotation, to modify the point of interaction between the laser and the resin. The apparatus (100) includes a control unit (102) that interacts with the different components of the apparatus (100) for facilitating precise control thereof. For example, the control unit (102) can be operable to control the operation of the laser (2), which includes controlling the movement and actuation of the laser (2). Further, the control unit (102) may be operable to control the movement of the movable stage (3), in accordance with the requirements of the object being formed.

It is essential to acknowledge that the embodiment described herein is representative and does not restrict the scope of the invention, as variations and modifications are feasible without deviating from the core objective of the disclosed technology.

Figure 2:
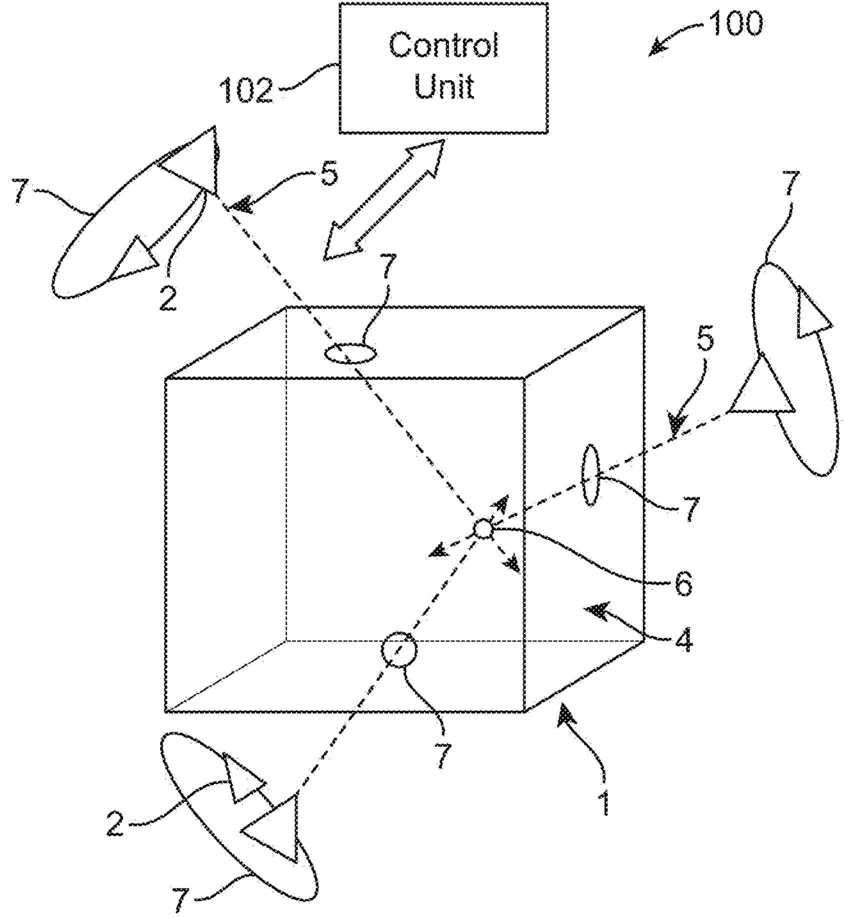
FIG. 2 illustrates a schematic an apparatus of forming three dimensional objects employing multiple lasers, in accordance with an embodiment of the present disclosure.

In another embodiment, as depicted in FIG. 2, an apparatus (100) for achieving enhanced depth and precision in the curing process within the resin (4) is disclosed, characterized by the utilization of a plurality of lasers. In the instant embodiment, the apparatus (100) comprises at least two lasers, each configured to emit a laser beam designed to converge at a specific target locus (6) within the resin.

A feature of this apparatus (100) includes the execution of a precession maneuver (7) with the laser beams, which is a strategic movement that serves to modulate the concentration of emitted energy proximate to the intersection point (6). This modulation functions to obviate premature solidification along the traversed trajectory of the beams prior to their intended convergence. This precession maneuver (7) of the laser is controlled or governed by the control unit (102), in accordance with an embodiment of the present invention.

In accordance with an embodiment of the present invention, when the liquid resin is chilled (around −20° C.) or frozen (around −78° C.) it becomes less sensitive to activation by the laser beam. In an embodiment, such temperature control of the liquid resin can be facilitated using a temperature control unit, wherein the temperature control unit can be any type of refrigeration unit that can reduce the temperature of the liquid resin in accordance with the application requirements. Thus, the beam carries its energy deeper into the liquid resin. If two or more beams that are individually incapable of productively activating polymerization of the resin are targeted at the same spot within the liquid resin, the resin may be activated at the point of convergence.

It is to be noted that instant embodiment of the apparatus (100), while described in the context of utilizing a specific number of lasers, may be subjected to variations encompassing either an increase or decrease in the number of lasers employed. This modification can be implemented without deviating from the fundamental principles underlying the disclosed invention. The scope of the current invention, therefore, should not be construed as being limited strictly to the configurations as described within this document.

Furthermore, it is to be noted that the operational parameters, including but not limited to the intensity, angle of incidence, and precession rate of the laser beams, can be calibrated based on the requisite curing depth and the physical properties of the resin (4) used by the control unit (102). These adjustments contribute to the customization and adaptability of the curing process, thereby enhancing the utility and efficacy of the apparatus in various applications.

Figure 3:
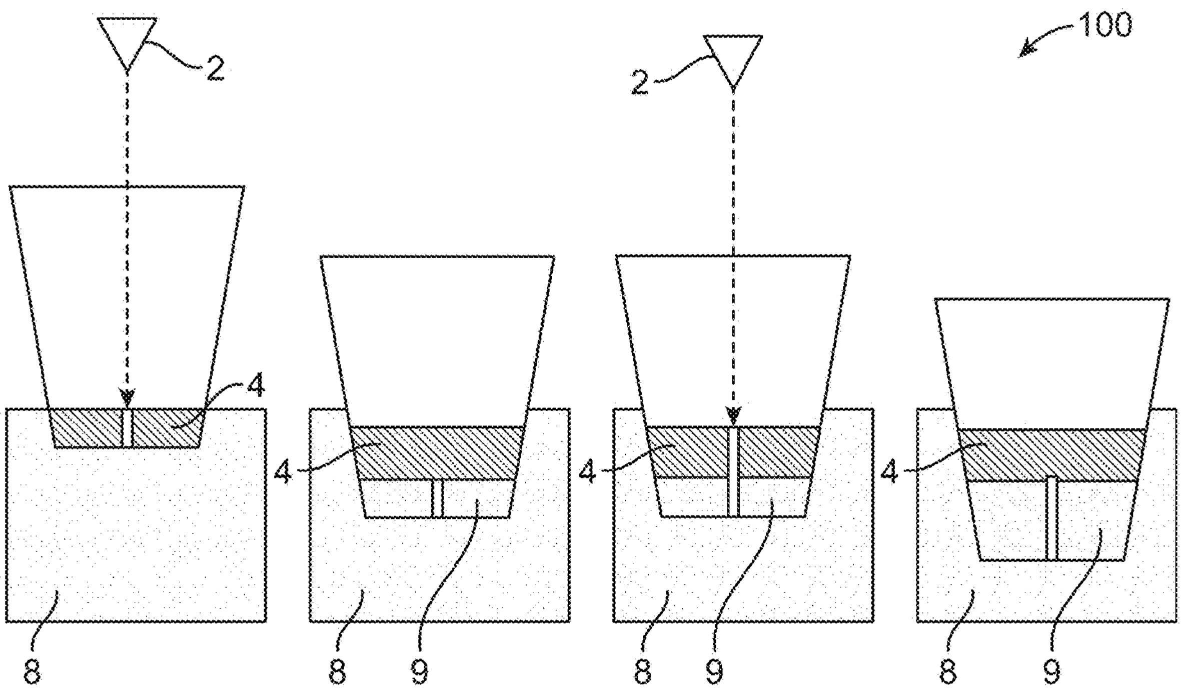
FIG. 3 illustrates a schematic view of the apparatus, displaying the selective activation of a resin layer by a laser, followed by solidification through a cooling process, in accordance with an embodiment of the present disclosure.

In yet another embodiment illustrated in FIG. 3, an apparatus (100) is disclosed, characterized by its capacity for fabricating layered structures through an interplay of photopolymerization and thermal regulation within the resin (4).

The apparatus (100) is equipped to initiate a targeted solidification process on the resin (4) by harnessing the laser (2). The laser's operational parameters, such as intensity and exposure duration, are adjustable, ensuring adaptability to the specific attributes of the resin (4) and the desired characteristics of the resultant product. The functionality of the laser (2) is pivotal for the precise initiation of the resin's (4) transition from a liquid to a semi-solid state within a defined region.

Subsequent to the photopolymerization stage, the apparatus (100) integrates a cooling mechanism, capable of immediate temperature reduction within the selectively solidified segment of resin. In one exemplary embodiment, the cooling mechanism used may be a cold bath (8) or an alternative entity capable of inducing the state referred to as freezing (9). In one embodiment, the design of the apparatus (100) permits the modulation of cooling parameters, including temperature and duration, vital for influencing the resin's (4) thermal characteristics and the structural integrity of the formed layer.

The functionalities of the apparatus (100) also include the provision for iterative processing, allowing for the sequential construction of layers, each solidified and thermally modulated atop the preceding one. Such a systematic approach affords control over the construct's architectural intricacies and geometrical conformity.

It is to be noted that the initial state of a product after irradiating UV-activated liquid resin with one or more lasers is often a tuff but flexible semisolid. The surrounding resin provides some support (especially if chilled or frozen) but once the residual liquid resin is removed, the product may collapse upon itself. In accordance with an embodiment of the present invention, this scenario can be avoided by displacing the residual resin (density about 1.05 g/mL) from the product (semisolid density about 1.10 g/mL) with a saline solution of density about 1.10 g/mL. If an excessively dense saline solution is used, the product will float upward with the residual resin and collapse upward into the mass of floating liquid resin.

Figure 4:
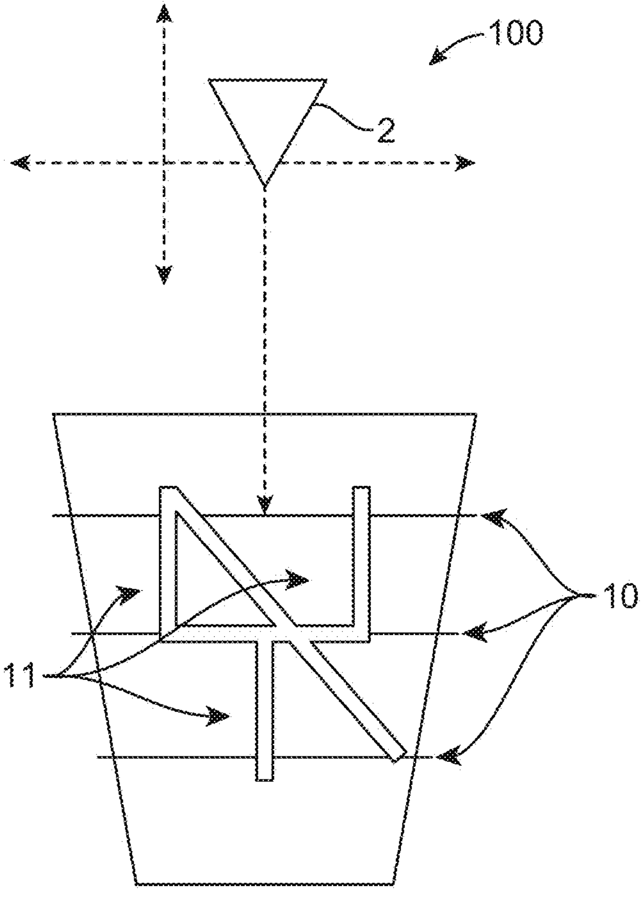
FIG. 4 illustrates a schematic view of the apparatus detailing support lines attached within or outside the container, ensuring structural integrity of the formed object during critical phases of the laser application and subsequent resin removal, in accordance with an embodiment of the present disclosure.

In yet another embodiment depicted in FIG. 4, an apparatus (100) is described, equipped with functionalities that ensure the structural integrity of semi-solid constructs (11) during fabrication. In this apparatus (100), support lines (10) are designed to fortify the stability of the emerging structure (11) throughout its developmental phases. In an embodiment, the support lines are a web of fine transparent plastic fibers (less than 0.2 mm, monofilament fishing line) anchored to the container or externally. In an embodiment, these fibers are incorporated into the structure (11) and allow it to retain its shape as the residual liquid resin is drained by gravity or displaced upward by dense saline solution. The pattern and number of the plastic support lines is determined based on the planned shape of the build, although random patterns are adequate in many cases as individual lines can support as much as 4-lbs of weight. Of course, other rigid or flexible materials can be used as supports provided they are compatible with the build process.

The apparatus (100) is operable to extend the support lines (10) from various segments of the semi-solid structure (11), securing them to either the container confines or another established structure external to the apparatus. Such anchoring functionality provides necessary resistance against mechanical stresses that the semi-solid structure (11) may encounter, thereby safeguarding against potential collapse or geometric distortion during solidification or subsequent manipulations.

The apparatus (100) is characterized by adaptability, evident in the customizable aspects of the support lines (10). The apparatus (100) is operable to adaptively configure, quantify, and position the support lines (10). This is achieved by assessing the specific dimensions, shape, and expected mechanical stresses of the structure (11), thereby customizing the support framework in accordance with the particular requirements of each construct.

The apparatus (100) is not confined to a predetermined set of materials for the constitution of support lines (10). Rather, it accommodates a diverse array of materials, the selection of which is contingent upon a multitude of factors including, but not limited to, tensile strength, compatibility with the resin, non-interference with the curing process, and ease of subsequent extraction or dissolution.

Figure 5:
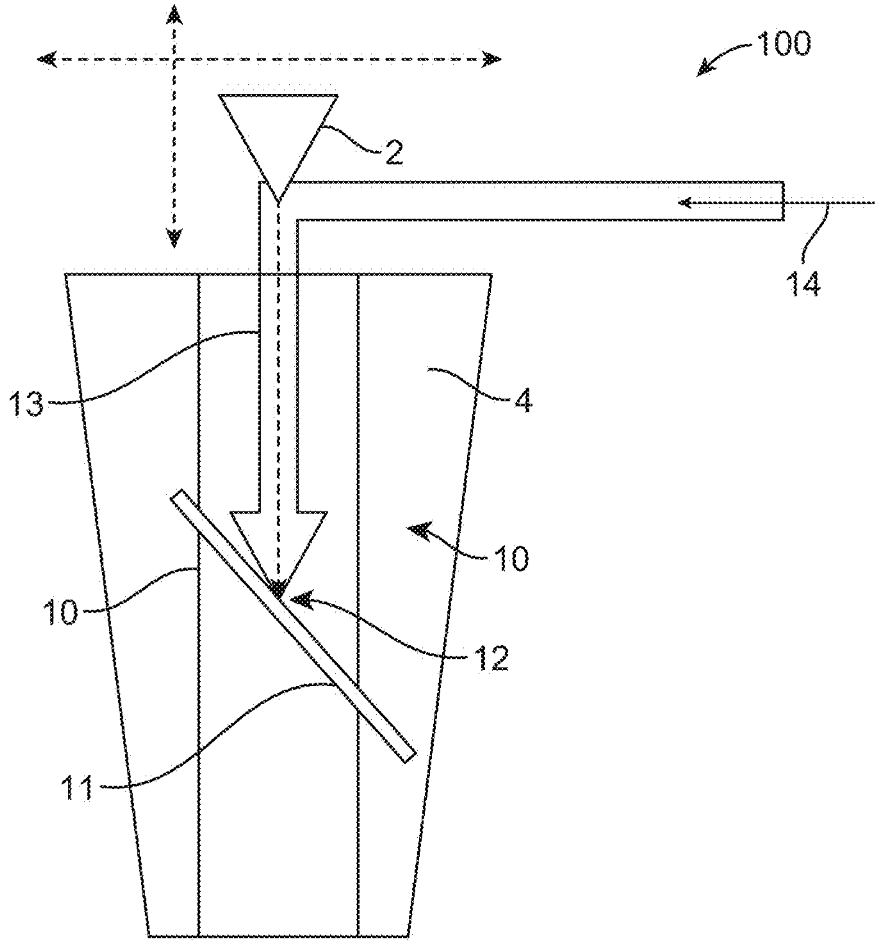
FIG. 5 illustrates a schematic view of the apparatus, utilizing a hollow opaque probe to direct the laser beam deep into the resin, in accordance with an embodiment of the present disclosure.
Figures 6, 7:
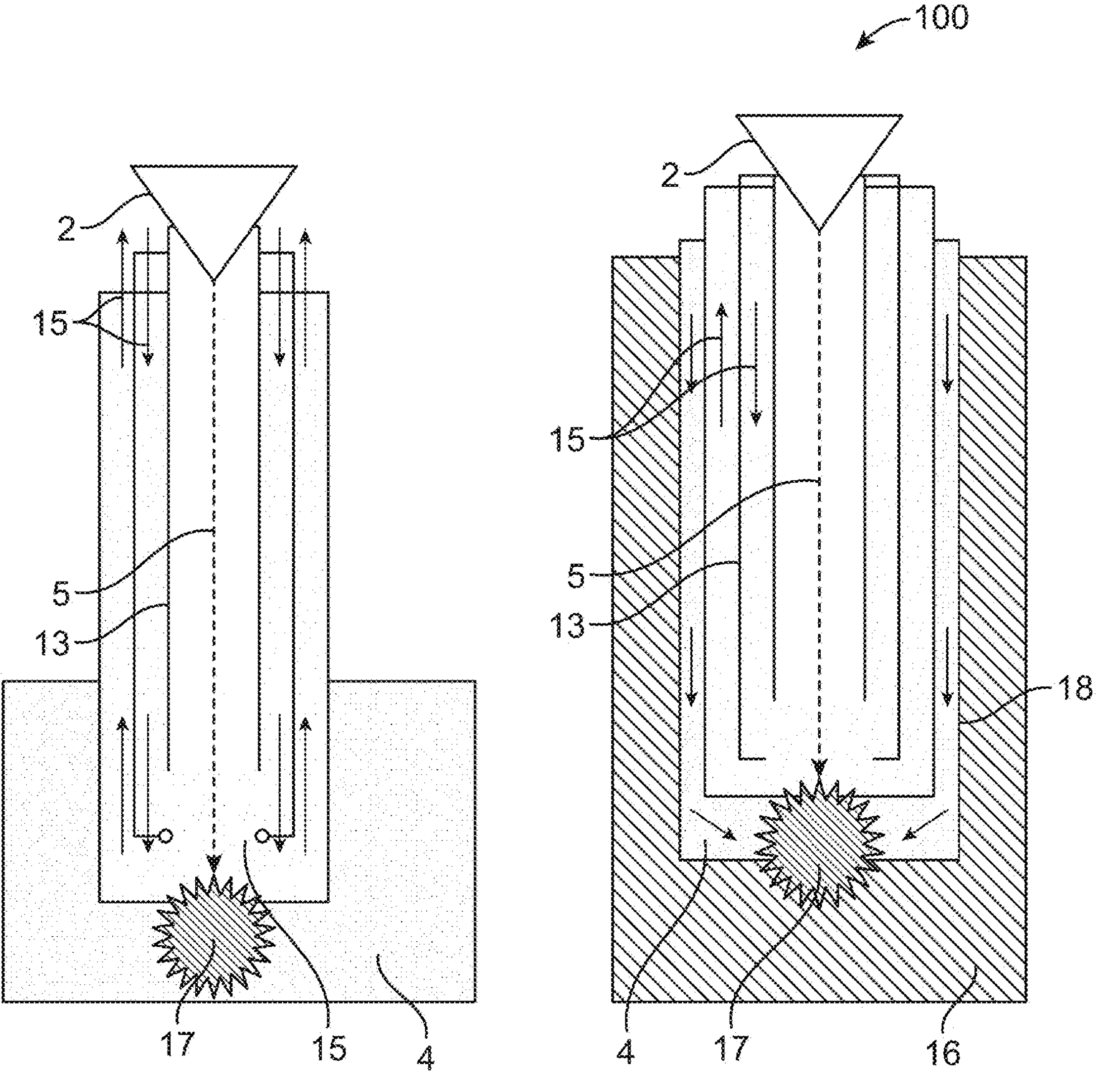
FIG. 6 illustrates the schematic view of the apparatus illustrated
FIG. 7 illustrates the schematic view of the apparatus illustrated FIG. 5, incorporating the external tube facilitating inert gas circulation to protect the probe amidst the resin, in accordance with another embodiment of the present disclosure.
Figure 8:
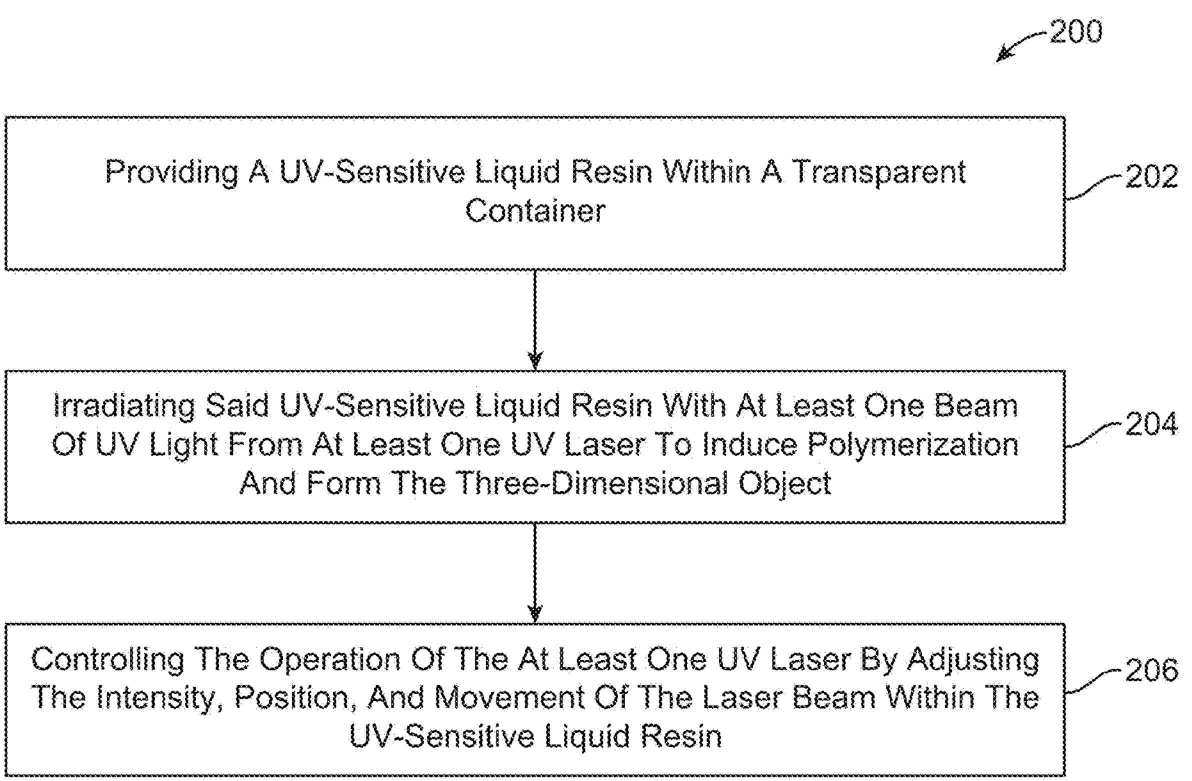
FIG. 8 illustrates a block diagram view of a method of forming three dimensional objects, in accordance with an embodiment of the present disclosure.
Figure 9:
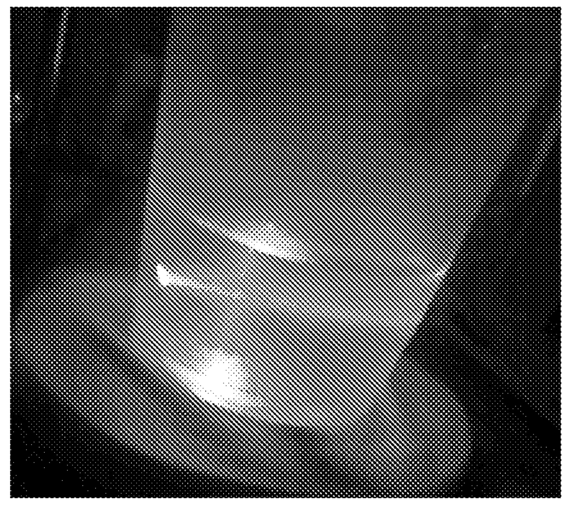
FIG. 9 illustrates two weak intersecting laser beams on a rotating sample and blue produce suspended in the resin.
Figure 10:
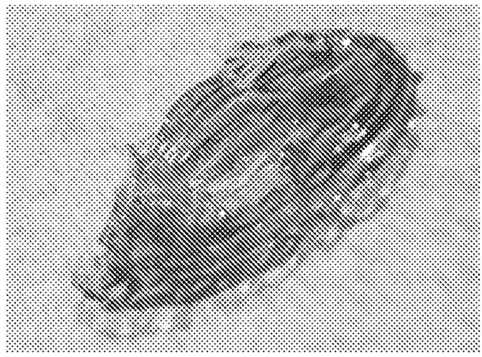
FIG. 10 illustrates a product following polymerization and removal from the unreacted resin.

In the embodiments disclosed in FIGS. 5 and 6, an apparatus (100) is described involving a hollow probe (12, 13) for directing a laser beam (2) into a resin pool (4). Protection of the probe interior from resin is effectuated by a continuous flow of inert gas (14), thereby maintaining an unobstructed path for the laser beam and preventing resin ingress.

In the embodiment of FIG. 5, support lines (10) are employed, offering structural reinforcement to a nascent structure (11). These support lines (10) provide stability, helping counteract gravitational or other mechanical forces that could induce deformation or structural compromise during the fabrication stages. In an embodiment, the support lines (10) define a channel that is formed by a pipe of a rigid material or a flexible material, wherein such material is chosen as per the object being formed and the type of resin being used. In this embodiment, the liquid resin and laser can be combined into a tool that combines the functionality of a conventional welding tool and a conventional three-dimensional printing tool. In this arrangement, the components typically would be mounted similar to a three-dimensional printing system on a stage and would be controlled by a computer. However, it could operate like a welding tool and be used free-hand to join or repair objects. The system can be constructed in such a way that it could operate underwater and in a saline solution. Indeed, a dense saline solution can help support the build and dissipate the heat of polymerization. Nonetheless, the ability of the laser to render the resin completely solid (self-supporting) very quickly eliminates the need for extensive building of support structures and facilitates the incorporation of inclusions that would disrupt the flow of melted plastics used in conventional three-dimensional printing.

In a further embodiment of the apparatus (100), as shown in FIG. 6A, an enhancement is introduced wherein a return pathway for the inert gas is established, wherein the return pathway is indicated by the arrows (15), thereby contributing to sustained probe functionality and structural integrity over prolonged operational periods. Additionally, this embodiment of the apparatus (100) incorporates a mechanism for transporting fresh resin (4) to the probe's terminus, thus streamlining the resin replenishment process and ensuring consistent fabrication operations.

In the depicted system, as shown in FIG. 6B, a tube (18) is provided to deliver liquid resin (4) to the tip of the probe (12). The probe is continuously protected by a flow of recirculating inert gas (14). This setup allows the probe, along with its components, to operate within a dense inert liquid (18), where the liquid resin is activated and polymerized and region (17) indicates the activated and polymerized portion of the liquid resin. For the construction of three-dimensional objects using this resin, the tool, as illustrated in FIG. 6B, is typically controlled by a computer system. It operates over a stage (16) in a manner similar to conventional three-dimensional printing that uses a fusible solid resin. As the liquid resin is capable of being solidified into a self-supporting structure during the build process, the creation of separate solid supports is not required. This characteristic also enables the inclusion of various solid materials within the build, as previously described, enhancing the functionality and diversity of the final product.

FIG. 7 illustrates a block diagram depicting a method for forming 3D objects (200) (hereinafter referred to as method 200), in accordance with an embodiment of the present invention. At block (202), the method (200) starts with the placement of the UV-sensitive liquid resin within a container that allows UV light penetration. At block (204), the method (200) includes initiating polymerization by irradiating the resin with UV light beams from one or more lasers. These lasers emit in the wavelength range of 200 to 450 nm, effectively transitioning the resin from a liquid to a solid state to form the desired three-dimensional structures.

At block (206), the method (200) includes controlling the UV laser(s) operation, necessitating adjustments in the intensity, position, and movement of the laser beam within the resin. This control dictates the specific areas of polymerization, ensuring the irradiation of selected points within the resin, while other areas receive varied levels of irradiation. This strategy prevents curing the resin prematurely at undesired locations or depths. In addition, penetration of the laser-induced polymerizations into the liquid may be maximized by irradiating the resin in bursts, with periods of time between bursts to allow activated liquid resin sufficient time to form polymers. Irradiation the resin in bursts is effective because acrylic resins contain high concentrations of carbon-carbon double bonds and are very sensitive to UV radiation 450 nm and below. Polymers are formed by converting these double bonds to single bonds, which are essentially transparent to laser light. Thus, allowing deeper penetration of the laser beam into the liquid resin when desired.

In one embodiment, the method (200) includes thermal control mechanisms, chilling the resin to retard polymerization before the UV light reaches deeper regions within the material. Maintaining a consistent temperature throughout the polymerization process is paramount to avoid adverse effects on the structural and dimensional attributes of the resulting object.

In one embodiment, the method (200) includes the use of multiple beams from various UV lasers or the incorporation of additional UV-emitting devices within the resin. The convergence of beams from different sources compensates for intensity loss due to scattering or absorption, promoting uniform curing throughout the resin.

In one embodiment, the method (200) includes adjusting the resin's depth within the container by employing a stage or similar mechanism inside the container, controlling the resin volume subjected to UV irradiation. This feature benefits the creation of objects with varying thicknesses or those requiring distinct layer depths.

To prevent undesirable oxidative reactions during polymerization, in one embodiment, the method (200) includes replacing the air in the environment above the resin with an inert gas, preserving the structural or optical properties of the formed object.

After polymerization, the method (200) includes separating the solidified object from the residual liquid resin using various techniques, including leveraging a density difference with immiscible solutions or introducing an organic solvent such as acetone. These agents hinder further polymerization and facilitate the removal of the formed object. After separation, the object may undergo additional curing stages using UV irradiation or heat application to achieve specific mechanical, structural, or aesthetic properties.

Throughout the performance of the method (200), the real-time monitoring of polymerization is made possible through the inclusion of leuco-dyes, such as leuco-crystal violet (LCV), indicating the reaction's progress through a visible color change. This non-intrusive monitoring ensures that the structural integrity and the detailed intricacies of the three-dimensional objects are maintained.

Furthermore, in accordance with one embodiment of the method (200), a variety of materials and objects can be included within the solid or semi-solid product. The inclusions may be present in a settled state or dispersed within the resin. They may also be suspended or supported within the resin. The positioning of the inclusions can be allocated to specific areas by freezing part of the resin before adding the inclusion and then filling the remaining volume. Inclusions can be of virtually any shape or size. Common examples include but not limited to (i) powders of plastics, glass, wood or metals, (ii) fabricated parts (such as nuts, bolts, screws), (iii) fibers (of carbon, plastics, glass, cellulose or metals), (iv) chemical compounds such as crystals of salt or sugar, or (v) fully functional mechanical or electrical devices (such as motors, transistors, lights, batteries).

Molds or other materials intended to help form the shape of the final product may also be included within the resin and removed after the solid resin has been formed.

It should be construed that the present descriptions of the embodiments are to be considered as illustrative rather than restrictive, and it is understood that various other modifications and changes may be made by one skilled in the art without departing from the scope of the present disclosure.

The embodiments delineated within this document are representative, serving to elucidate the foundational principles critical to the expansive innovative capacity intrinsic to this technology. These instances should not be perceived as exhaustive but rather indicative of the broader potentialities that may be actualized through diverse configurations and applications.

It is imperative to acknowledge that the specifics relayed in the present disclosure are illustrative, crafted to impart an understanding of the core technological principles. This articulation should not be interpreted as constrictive or limiting the scope of the invention. The potential for variations, modifications, and alternate implementations, apparent to those skilled in the art, is implicit within the ambit of this invention, and extends beyond the exemplary embodiments detailed herein.

Although the features, functions, components, and parts have been described herein in accordance with the teachings of the present disclosure, the scope of coverage of this patent is not limited thereto. On the contrary, this patent covers all embodiments of the teachings of the disclosure that fairly fall within the scope of permissible equivalents.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A method for forming a three-dimensional object, the method comprising the steps of:

a. providing a UV-sensitive liquid resin within a transparent container;

b. irradiating said UV-sensitive liquid resin with at least one beam of UV light from at least one UV laser to induce polymerization and form the three-dimensional object;

c. controlling the operation of the at least one UV laser by independently adjusting locations of the at least one UV laser, movements of the at least one UV laser, intensities, and angles of incidence of the beam or beams emitted by said at least one UV laser within the UV-sensitive liquid resin;

d. chilling the UV-sensitive liquid resin to prevent premature polymerization before the UV light penetrates deeper into the UV-sensitive liquid resin; and e. wherein the irradiating step includes using the at least one UV laser emitting light within a wavelength range of 200 to 450 nm, and further wherein the controlling the operation step includes controlling a precession maneuver, wherein controlling the laser's position and precession of the emitted laser beam such that the precession maneuver orients the beam to continuously pass through a single point.

* * * * *